Feb. 16, 1971  X. G. PRICE  3,564,486
ELECTRICAL JUNCTION BOX
Filed Jan. 9, 1969

Xenophon G. Price
INVENTOR.

BY Clarence A. O'Brien
and Harvey B. Jacobson
Attorneys

United States Patent Office 3,564,486
Patented Feb. 16, 1971

3,564,486
ELECTRICAL JUNCTION BOX
Xenophon G. Price, Hayesville, N.C., assignor of fifty percent to Gladys Kilpatrick, Murphy, N.C.
Filed Jan. 9, 1969, Ser. No. 793,642
Int. Cl. H01r 7/12, 13/22
U.S. Cl. 339—217
3 Claims

ABSTRACT OF THE DISCLOSURE

A junction box device having a plurality of connector assemblies therein. Each connector assembly includes a block removably secured within the junction box housing. The block is characterized by an inwardly formed elongated passageway adapted to receive a stripped power supply conductor therein. A plurality of inwardly formed transverse passageways are disposed in spaced perpendicular relation to the first elongated passageway, each transverse passageway being adapted to receive additional strip conductors therein. Fastening means are provided by each transverse passageway for causing the deformation of each transversely extending conductor around the power supply conductor so that electrical interconnection is effected.

---

The persent invention relates to connectors and more particularly to connectors designed for use in electrical junction boxes.

In conventional wiring installations, a junction box is used as a housing for power supply and appliance leads which are spliced together by mechanical means and retained within the junction box. More sophisticated junction boxes include insulative connector assemblies therein with screw terminals secured within the insulator material. Each screw terminal acts as a junction point or binding post for a plurality of leads which are generally crimped around the terminal. Although these prior junction box devices have proven generally satisfactory, there are a number of attendant disadvantages in the structure or use thereof. For example, the prior devices expose electrified terminal points which present a shock hazard. Further, unless leads are skillfully prepared insecure connections are made thus presenting a hazard should a lead be loosened from a connection point. As will be appreciated, if such unloosening occurs, power failure will result.

In brief, the essence of the present invention resides in a connector assembly for use in a junction box housing. The assembly permits the interconnection of wires by inserting conductor leads into an insulative block and connecting the conductors together by crimping engagement within the block. A distinct advantage of the present invention is the interior interconnection of conductors within the insulative block thereby eliminating exposure of metallic conductors which may cause electrical shocks or short circuits.

The present invention is superior to prior art devices in regard to manufacturing considerations because no metal conductors are embedded within the connector assembly. Instead the power supply leads inserted into the connector assembly serve as bus bars.

A further advantage of the present invention resides in the design which permits rapid connection of power leads by only using a screwdriver. When using the present invention, the forming of a loop or attaching a lug on each lead end is unnecessary. Instead, each lead is merely stripped of its insulation for a predetermined length and is then received within interiorly formed passageways which permit juxtaposed engagement between interconnected leads. Means are provided for crimping the juxtaposed leads together thereby ensuring proper electrical contact.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
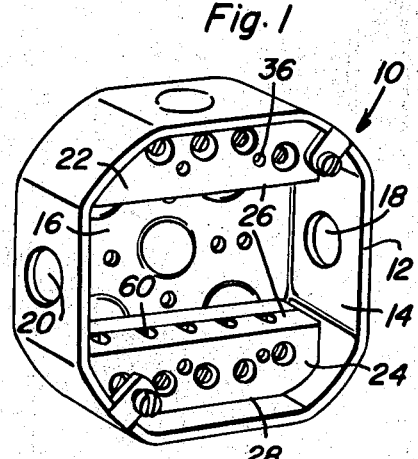
FIG. 1 is a perspective view illustrating the interior of a junction box with the connector assemblies of the present invention included therein.

Referring to the drawings, and more particularly FIG. 1 thereof, reference numeral 10 generally denotes a junction box device having a conventional octagonal housing 12 formed by a peripheral wall 14 and a base 16. Numerals 18 and 20 denote the usual "knock-outs" or oppositely disposed apertures formed in the peripheral wall 14 of the housing.

Connector assemblies 22 and 24 in the form of prismatic insulative blocks have side surfaces in intimate contact with the interior surface of the peripheral housing wall 14 and base 16. When installed within a junction box housing, adapted for single phase operation, two blocks are used in parallel spaced confronting relation. An axis extending through apertures 18 and 20 also defines a line of symmetry relative to the disposition of the blocks 22 and 24. The confronting edges of the blocks 22 and 24 are rectangular and planar in nature as indicated by 26. As will be noted from the illustrated embodiment in FIG. 1, the remaining surfaces of each block include five adjacent sides, denoted by 28, which conform to the interior surface of the housing 12.

Figure 5:
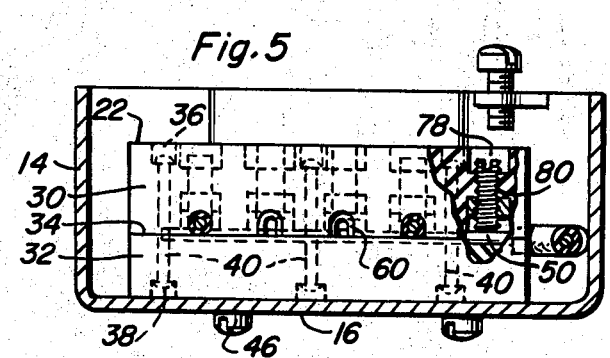
FIG. 5 is a longitudinal sectional view taken along a plane passing through section line 5—5 in FIG. 2.

As seen in FIG. 5, each block is fabricated from two mating members 30 and 32 having mutually planar contacting surfaces as indicated by 34. In order to retain the members in engaged or secured position, three pairs of counterbores 36 and 38 are formed in the outward surfaces of the joined members as indicated by dotted line. A bore connects the counterbores 36 and 38 thus permitting the rod portion of a rivet 40 to pass therethrough. The opposite ends of the rivet bear against the inward surface of the counterbores. As will be noted in FIG. 5 each connector block includes a row of three longitudinally aligned and spaced rivets 40 serving to retain the mating members of each connector block together.

Figure 4:
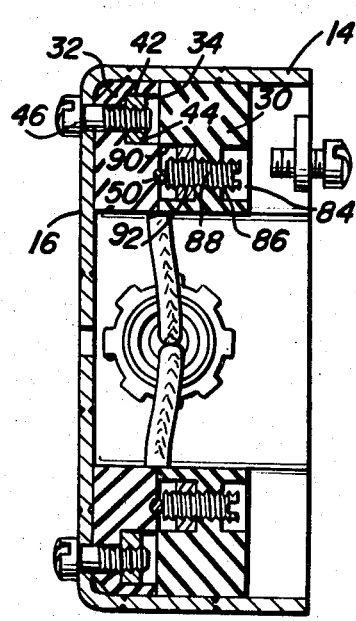
FIG. 4 is a transverse sectional view taken along a plane passing through section line 4—4 of FIG. 2.

In order to utilize the present invention, the connector blocks 22 and 24 must be removed from the junction box housing so that electrical leads can be inserted within the block. In order to retain the connector blocks in position within the housing, threaded fasteners 46 are provided as seen in FIG. 4. Each member 32 has a pair of recesses 42 extending inwardly from the joining surface 34, the recess receiving a threaded nut 44 therein which is prevented from rotating due to the corresponding cross-sectional shape of the nut 44 and the recess 42. The recess 42 extends outwardly through a stepped passage which is in alignment with an aperture formed in the base 16 of the housing. Thus, the threaded fastener 46 can be inserted through the base 16 and into threaded engagement with nut 44 which permits the clamping of the connector assembly member 32 to the base plate 16.

Figure 2:
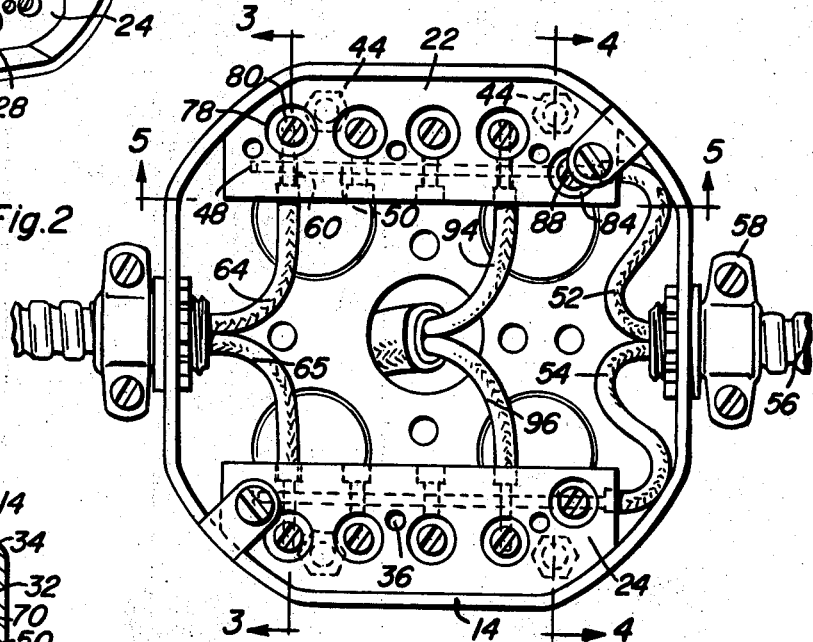
FIG. 2 is a top plan view illustrating the disposition of electrical leads in passageways within the connector assemblies.

FIG. 2 illustrates the disposition of electrical leads within the junction box. It is the means for effecting the connection between these leads. Each of the connecting blocks 22 and 24 accommodates one wire of a two-wire, single phase connection. Thus, for purposes of clarity, the means for effecting wire interconnection will be explained for connector assembly block 22. Of course, as will be appreciated, the same principles will apply to the other block 24. Also, the present invention can be adapted to accommodate any number of wires in a multiphase system.

With continuing reference to FIG. 2, an elongated passageway 48 as shown by dotted line is formed inwardly from one transverse end of connector block 22. A cross-sectional diameter of the passageway is defined by the joining surfaces 34 between the mating members 38 and 32, which constitute the block 22. The passageway 48 is adapted to receive an elongated stripped wire conductor portion 50 associated with a first input power lead 52. A second wire 54 is identically disposed within block 24. The wires 52 and 54 comprise a cable encased within a conventional protective shield 56 which is secured to the junction box housing by means of a suitable conventional clamp 58. The stripped power feed wire portion 50 serves as a bus bar to which other leads may be crimped.

As seen in FIGS. 1 and 2, a plurality of slots 60 extend inwardly from the planar surface 26 of the outward connector assembly member 30. Each slot extends upwardly from the joining surface 34. As FIG. 5 illustrates, each of the aforementioned passageways has a generally inverted U-shaped cross-section. From FIG. 3, it will be noted that the slot 60 includes a passageway portion 62 of smaller diameter than the inlet portion of the slot forming an inwardly disposed shoulder which contacts the outward insulating edge of a lead thereby limiting the inward movement of the lead.

Figure 3:
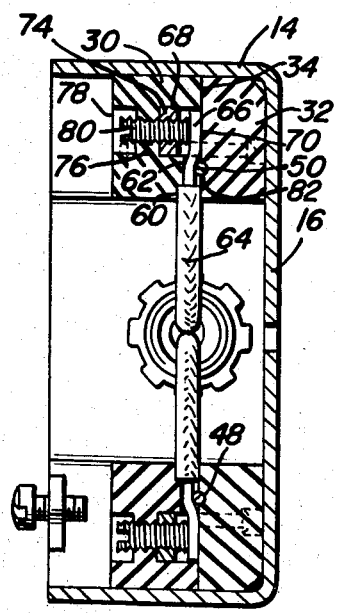
FIG. 3 is a transverse sectional view taken along a plane passing through section line 3—3 of FIG. 2.

Referring to FIGS. 2 and 3, it will be noted that the wires 52 and 54 serve as input leads while leads 64 and 65 inserted within oppositely disposed passageways 60 serve as junction box output leads. The latter mentioned wires are associated with a cable and cable support identical to 56 and 58 respectively.

Referring to FIG. 3 there is shown a terminal portion 66 of wire 64, the terminal portion being received within a recess 68, the latter formed in the member 30 of the connector assembly block. The recess 68 extends inwardly into the member from the joining surface 34. A threaded nut 74 is disposed along the inward surface of the recess. An internally threaded bore 76 connects recess 68 with a second recess 78 formed in coaxial alignment with bore 76 and receiving a setscrew 80. As will be noted from FIG. 3, the setscrew has a flattened inner end adapted to contact the terminal portion 66 of lead 64. Upon adjustment of the setscrew, the inward end is made to bear or clamp the terminal portion 66 against the joining surface 34 at a point indicated by 70. As will be noted in FIG. 3, the passageway 48 receiving bus bar 50 therein is formed in perpendicular spaced relation to the passageway portion 62. Thus, upon insertion of terminal conductor portion 66, perpendicular crossing contact with bus bar 50 is effected.

When setscrew 80 is tightened, after bus bar 50 and terminal portion 66 are in place, the terminal portion is deformed or crimped at 82 around a juxtaposed portion of bus bar 50 so that securement between the conductors is accomplished. The bearing engagement between the inward end of setscrew 80 and the terminal portion 66 of lead 64 prevents outward displacement of the lead.

Referring to FIGS. 2 and 4, there will be seen another setscrew 88 is positioned in line with the bus bar 50. The outward recess for receiving the setscrew 88 is denoted by 84. The purpose for the latter mentioned setscrew is to prevent withdrawal of the bus bar 50 from the passageway 48.

Referring to FIG. 4, the inward end of setscrew 88 is seen to be disposed within a recess 90 formed in member 30 and extending inwardly from the joining surface 34. A nut 92 is engaged by the recess walls 90. A threaded bore 86 in member 30 extends between the recesses 90 and 84 so that the setscrew 88 may be threadedly received within the latter mentioned bore and the nut 92. Although the present invention utilizes setscrews and threaded nut fasteners for securement within the connector assembly block, it will be appreciated that fiber screws may be employed in connector assembly members having thickened threaded portions.

Referring to FIG. 2, two leads 94 and 96 are shown to be connected to respective bus bars 50 within connector blocks 22 and 24. As will be noted the terminal end portion of each lead is secured within a respective connector block as previously explained in connection with leads 64 and 65. Thus, by providing a plurality of passageways for insertion of several tap-off leads such as 94 and 96, appliance power leads may be easily and rapidly connected within the junction box.

While a plurality of passageways are provided to accommodate a plurality of appliance leads, if desired, plastic inserts may be positioned within those lead passageways not in use thereby preventing debris from accumulating within these passageways.

As previously explained, each connector block is assembled by means of rivets which hold the composite members of each block together. However, waterproof cement and potting the leads around the connector blocks may be used to form a waterproof assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A connector assembly comprising a block, an elongated passageway longitudinally formed in the block along a first axis, a first stripped wire portion received in said elongated passageway, at least one additional passageway formed in the block intersecting the elongated passageway along a second axis disposed in spaced relation to the first axis, a second stripped wire portion received in the additional passageway and means for deforming the second wire portion with the first wire portion thereby effecting an electrical connection therebetween.

2. The assembly set forth in claim 1 wherein the means for deforming the second wire portion includes a setscrew threadingly engaged within the block, the setscrew having an inward end engageable with the second wire portion in the additional passageway.

3. The assembly set forth in claim 2 wherein the setscrews and passageways are recessed within the block to prevent manual contact therewith thereby obviating a shock hazard.

References Cited

UNITED STATES PATENTS

| | | | |
|---|---|---|---|
| 2,427,965 | 9/1947 | Henderson | 339—210(U)X |
| 2,964,726 | 12/1960 | Michals | 339—149 |
| 3,038,141 | 6/1962 | Chiuchiolo | 339—164 |
| 3,256,509 | 6/1966 | Dochat | 339—150 |

MARVIN A. CHAMPION, Primary Examiner

R. A. HAFER, Assistant Examiner

U.S. Cl. X.R.

24—125; 287—50; 339—242, 244, 272